United States Patent [19]
Miller, Jr. et al.

[11] Patent Number: 4,661,828
[45] Date of Patent: Apr. 28, 1987

[54] OPTICAL IMAGING HEAD

[76] Inventors: Verelyn A. Miller, Jr., 5228 Cypress Ct., Lisle, Ill. 60532; Richard W. Diener, 9101 Barberry La., Des Plaines, Ill. 60016; Leonid Drapatsky, 624 Hibbard Rd., Wilmette, Ill. 60091

[21] Appl. No.: 713,835

[22] Filed: Mar. 20, 1985

[51] Int. Cl.$^4$ .................. G01D 9/42; G01D 15/14
[52] U.S. Cl. ................... 346/108; 346/160; 354/5
[58] Field of Search ............... 346/107 R, 108, 160; 354/5, 8, 4; 350/169, 170, 171, 172, 173, 174

[56] References Cited

U.S. PATENT DOCUMENTS

| | | | |
|---|---|---|---|
| 2,988,978 | 6/1961 | Craig | 95/73 |
| 3,280,714 | 10/1966 | Gunther | 95/42 |
| 3,402,976 | 9/1968 | Littmann | 350/173 |
| 3,438,050 | 4/1969 | Aschenbrenner | 346/108 |
| 3,464,337 | 9/1969 | Trankuer | 95/42 |
| 3,464,339 | 9/1969 | Trankuer | 95/42 |
| 3,475,096 | 10/1969 | Shingo | 355/70 |
| 3,498,705 | 3/1970 | Shingo | 353/20 |
| 3,669,538 | 6/1972 | Fowler | 355/67 |
| 3,779,146 | 12/1973 | Trankuer | 355/68 |
| 4,094,606 | 6/1978 | Camphausen | 355/3 R |
| 4,107,687 | 8/1978 | Pfeiffer | 354/5 |
| 4,129,379 | 12/1978 | Ogrisek | 355/57 |
| 4,189,763 | 2/1980 | Sazuki | 362/241 |
| 4,190,347 | 2/1980 | Siegmund | 355/1 |
| 4,278,981 | 7/1981 | Hill | 346/108 |
| 4,312,588 | 1/1982 | Minoura | 355/8 |
| 4,318,597 | 3/1982 | Kotani | 354/5 |
| 4,345,835 | 8/1982 | Kramer | 355/3 R |
| 4,358,199 | 11/1982 | Isago | 355/70 |
| 4,358,520 | 11/1982 | Hirayama | 430/54 |
| 4,358,793 | 11/1982 | Hosaka | 355/8 |
| 4,367,946 | 1/1983 | Varner | 355/71 |
| 4,380,387 | 4/1983 | Yajima | 355/3 R |
| 4,408,868 | 10/1983 | Thomas | 355/7 |
| 4,449,153 | 5/1984 | Tschang | 358/296 |
| 4,532,526 | 7/1985 | Behrens | 346/107 R |

FOREIGN PATENT DOCUMENTS

| | | |
|---|---|---|
| 5319725 | 5/1976 | Japan . |
| 5419321 | 7/1977 | Japan . |
| 5419320 | 7/1977 | Japan . |
| 5630155 | 8/1979 | Japan . |
| 5630154 | 8/1979 | Japan . |
| 5630153 | 8/1979 | Japan . |
| 5630156 | 8/1979 | Japan . |

Primary Examiner—E. A. Goldberg
Assistant Examiner—Mark Reinhart
Attorney, Agent, or Firm—Nicholas A. Camasto; John R. Hoffman

[57] ABSTRACT

An optical imaging head is disclosed for use with optical imaging apparatus. The optical imaging head includes a plurality of imaging devices reproducing respective segments of an original image. A reflector is included for reflecting at least a portion of the reproduced image segments from an off axis position such that those segments are directed onto a focal plane substantially perpendicular thereto and substantially undistorted. In one embodiment, the reflector includes a plurality of reflecting surfaces separated by transparent surfaces allowing at least a portion of the reproduced image segments to be reflected toward the focal plane and the remaining image segments to be directly focused onto the focal plane. In another embodiment, the reflector includes an interlaced reflecting structure allowing all of the reproduced image segments to be reflected perpendicularly onto the focal plane.

12 Claims, 8 Drawing Figures

OPTICAL IMAGING HEAD

BACKGROUND OF THE INVENTION

This invention relates to an improved optical imaging head for use with optical imaging apparatus.

Optical imaging heads are widely used in duplicating, copying and master making machines. An optical imaging head typically includes a plurality of imaging devices having an associated light source and lens system configured to allow light rays representing a reproduced image to be directed onto a focal plane.

The optical imaging head is part of an overall optical imaging apparatus which provides reproduction, transmission and manipulation of an original image such as text material, graphic material and combination original images. The optical imaging head may be used with copying machines, typesetters, plotters, non-impact printers, plate makers, facsimile machines, and the like. Such machines typically include digital electronics which allow the original image to be translated into a digital signal, transmitted and reproduced by the imaging devices of the optical imaging head.

Over the years, a variety of optical print heads have been developed. One such print head which utilizes imaging devices which angularly impinge on a focal plane is illustrated in U.S. Pat. No. 4,376,282 to Kotani et al. However, such angular impingement of light rays forming the reproduced image results in increased character deformation and increased separation of alternate segments of the reproduced image. In addition, in such an angular optical print head, character deformation and separation of alternate reproduced image segments increases as the distance between the imaging devices and the focal plane is altered.

Electronic cameras including segmented reflecting structures also are known in the art. One such device is illustrated in U.S. Pat. No. 3,779,146 to Tranker. The segmented reflecting structure disclosed by Tranker directs a portion of the light rays passing through the camera lens toward a view finder and the remaining light rays to a light meter device. This electronic camera device does not utilize a segmented reflecting structure to direct a highly resolved reproduced image toward a focal plane in an electronic imaging device and does not address any of the problems encountered therewith.

In view of the short comings of devices previously known, there is a definite need for a new and improved optical imaging head providing perpendicular impingement of the light rays of the reproduced image onto the focal plane. In addition, it is desirable to provide an optical imaging head which reduces the deformation and/or distortion of each reproduced character; which reduces separation of alternate reproduced image segments, thereby producing an improved optically reproduced image having superior resolution and coherency; and in which the amount of character deformation and/or distortion, and the amount of separation of alternate reproduced image segments are not dependent on the distance between the imaging devices and the focal plane.

It is desirable to provide an optical imaging head which is simple in construction, efficient in operation and can be retrofitted to existing copying, duplicating, plate making, facsimile and similar machines.

SUMMARY OF THE INVENTION

The optical imaging head of this invention substantially minimizes the disadvantages noted above by providing an improved optical imaging head for directing at least a portion of a reproduced image, emulating an original image, from an off axis position onto a focal plane. A plurality of imaging devices reproduce respective segments of an original image. The optical imaging head directs the image segments along a portion of a plane substantially perpendicularly intersecting the focal plane.

More specifically, a reflecting element is provided for reflecting at least a portion of the reproduced image segments from an off axis position such that those segments are directed onto the focal plane substantially perpendicular thereto and substantially undistorted. A portion of the image segments may also be directly focused onto the focal plane, impinging perpendicularly thereon.

In one exemplary embodiment of the invention, predetermined portions of the image segments are focused directly onto the focal plane. The remainder of the image segments are reflected from a position at one side of an axis perpendicularly intersecting the focal plane such that the remaining image segments perpendicularly intersect the focal plane. Therefore, all of the image segments are directly focused or reflected onto the focal plane such that they impinge upon the focal plane at a 90 degree angle. Accordingly, to accomplish reflection of predetermined reproduced image segments onto the focal plane, the improved off axis optical imaging head of this embodiment includes a reflector having a plurality of reflective surfaces separated by a plurality of non-reflective surfaces.

In a second exemplary embodiment of the invention, all of the reproduced image segments are directed from an off axis position substantially perpendicularly onto the focal plane. This is accomplished by two reflectors each having a plurality of reflective surfaces separated by non-reflective surfaces. Preferably each non-reflective surface comprises a cut out portion between each reflective surface. The two reflectors are interlaced such that the reflective surfaces of one reflector are positioned between the cut out portions of a second reflector, while the reflective surfaces of the second reflector are positioned between a cut out portions of the first reflector. This provides an interlaced reflector which allows image segments eminating from at least two different off axis positions to be reflected onto a focal plane, substantially perpendicularly impinging upon the focal plane.

Off axis reflection and perpendicular focal plane intersection of reproduced image segments reduces the distortion of the image segments and their individual characters, while reducing the amount of separation between successive image segments. In addition, perpendicular intersection of the image segments with the focal plane allows the quality and coherency of the reproduced image to be maintained substantially independent of the distance between the imaging device and the focal plane. Further, the configuration of the improved off axis optical imaging head of this invention allows the above described advantages and features to be incorporated into electronic image reproducing devices, including master making machines, facsimile machines, copying machines, duplicating machines, typesetters, plotters, printers and the like, while providing a machine which is superior in resolution, efficient in operation and cost effective to manufacture.

Other advantages and features of the present invention will become readily apparent from the following detailed description, from the claims and from the accompanying drawings in which like numerals are employed to designate like parts throughout the same.

DETAILED DESCRIPTION OF THE ILLUSTRATED EMBODIMENTS

While the present invention is susceptible to embodiment in various forms, there are shown in the drawings and will hereinafter be described two preferred embodiments with the understanding that the present disclosure is to be considered as an exemplification of the invention and is not intended to limit the invention to the specific embodiments illustrated.

Referring to the drawings in greater detail, FIGS. 1-4 illustrate a first embodiment of the optical imaging head of this invention, generally designated 10. Optical imaging head 10 includes imaging means illustrated herein as a plurality of imaging devices 12 for reproducing respective segments of an original image. Each imaging device 12 includes an image forming portion which is illustrated as a light switched array 13. Each light switched array 13 is positioned behind a lens system 14, surrounded by a housing 16. A representation of a reproduced image, preferably in the form of an electronic signal, is supplied to each light switched array 13 at connections 17A and 17B. Each light switched array 13 includes a plurality of shutters which reconstruct a segment of the original image. A light source illuminates the shutters of light switched arrays 13 such that the reproduced image is then focused by transmission through lens system 14.

While the image forming portion of the optical imaging head of this invention is illustrated as a light switched array, it should be understood by one skilled in the art that the image forming portion can take a variety of configurations. Such configurations include, but are not limited to, light valves, light emitting diode segments, charge coupled devices, fiber optic arrays, and the like. It should also be understood that a variety of forms of original images which are represented by an electronic signal or a plurality of electronic signals also are contemplated. Such original images include, but are not limited to, hard copy originals, remotely loaded computer information, a combination of hard copy originals and remotely loaded computer information and the like.

Figure 2:
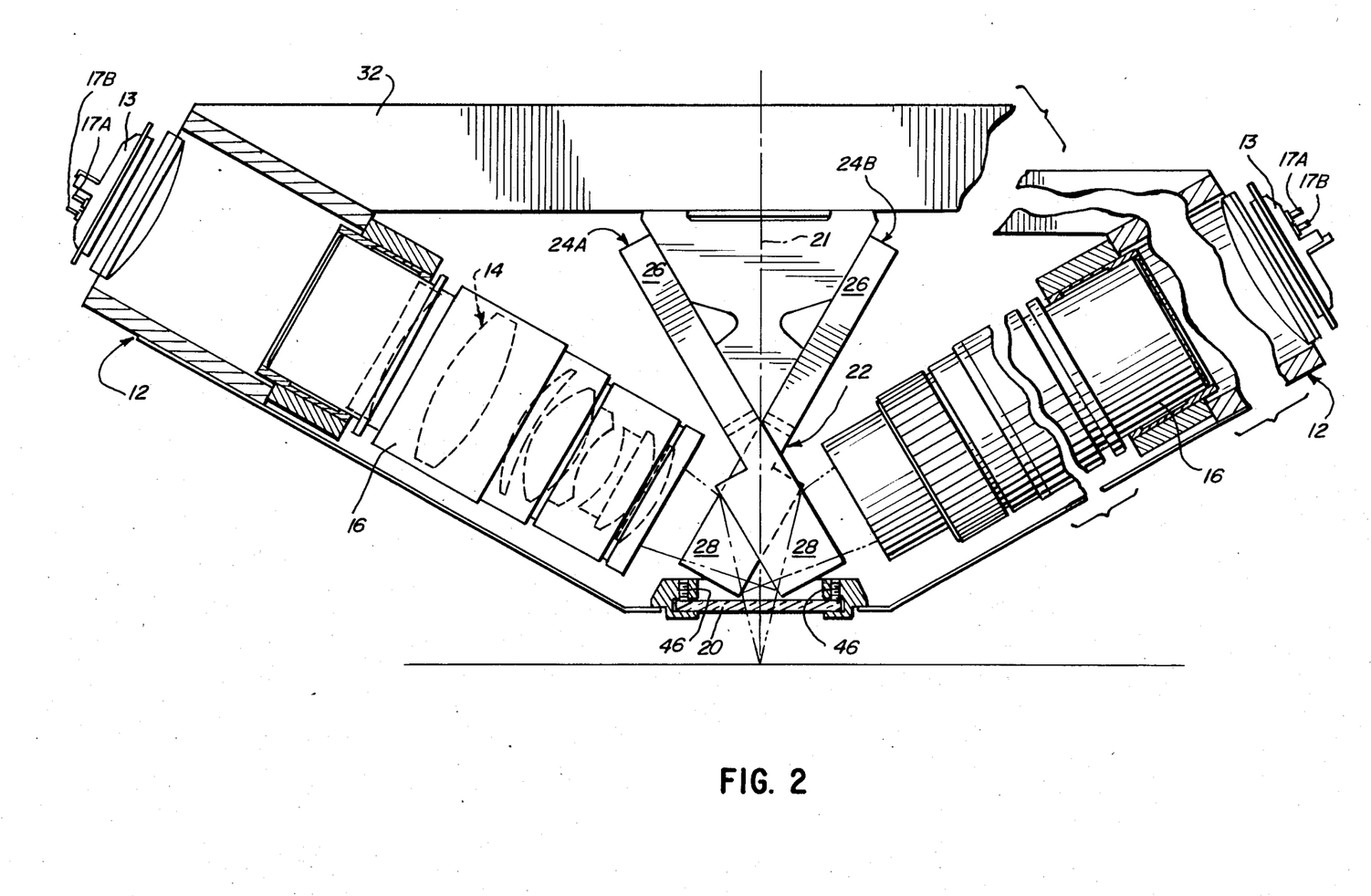
FIG. 2 is a front elevational view, partially broken away and on our enlarged scale, of the optical imaging head of FIG. 1, best illustrating the positioning of the imaging devices and the reflecting structure.

As can be seen, imaging devices 12 are configured such that they form two rows 18A and 18B which are off axis and at an acute angle with respect to a plane perpendicular to a focal plane 20, such as plane 21 illustrated in FIG. 2. Accordingly, a reflecting structure 22 reflects the light rays representing the reproduced image formed by imaging devices 12 of rows 18A, 18B and focuses the light rays onto focal plane 20. It may be appreciated that while each reproduced image segment formed by imaging devices 12 is reflected onto focal plane 20, an optical head configuration reflecting only a portion of the image segments onto focal plane 20 also is contemplated as described herein.

As shown in the first illustrated embodiment of FIGS. 1 through 4, reflecting structure 22 includes two interlaced reflectors 24A and 24B for reflecting the image segment produced by each imaging device 12 in each of the two rows 18A and 18B, respectively. Each reflector 24A and 24B includes a plurality of surfaces, illustrated as fingers 26. Fingers 26 eminate from an integral base portion 28 providing two rigid structures, each of which may be positioned to properly reflect each of the image segments produced by rows 18A and 18B, respectively. Fingers 26 are constructed such that a non-reflective or transparent cut out section 30 separates each finger, generally configuring each reflector 24A and 24B as a notched mirror. Fingers 26 are preferably selectively adjustable to allow precise individual adjustment of each reflected image segment onto the focal plane.

Figure 1:
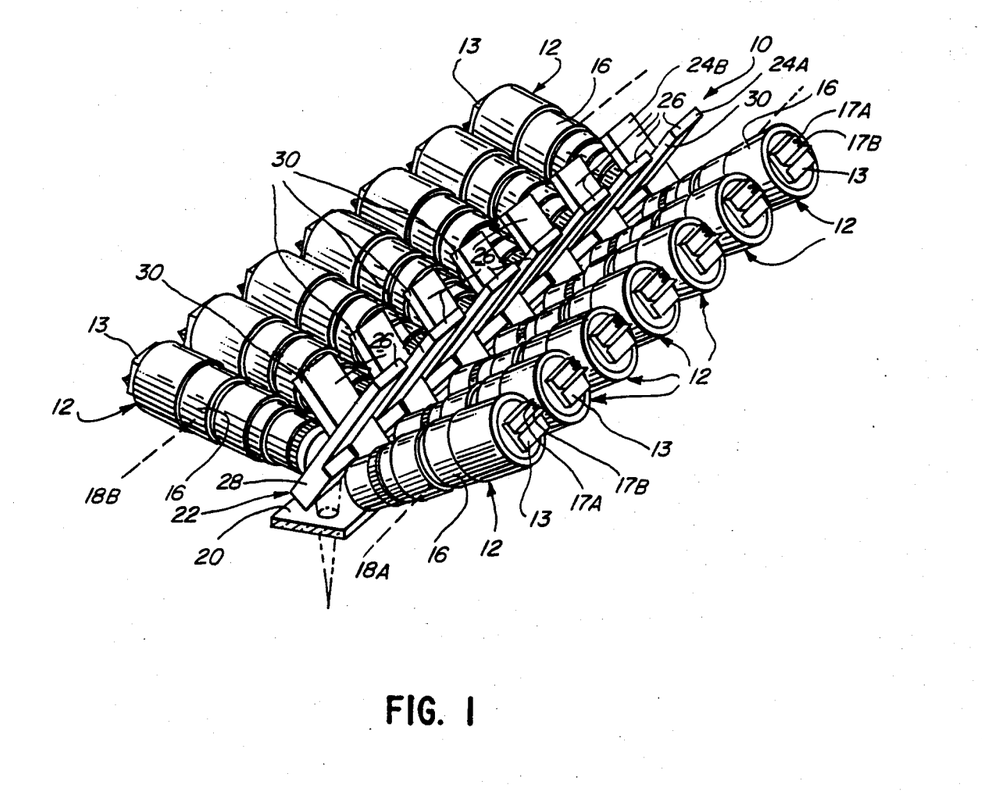
FIG. 1 is a perspective view of one embodiment of an optical imaging head of this invention.
Figure 3:
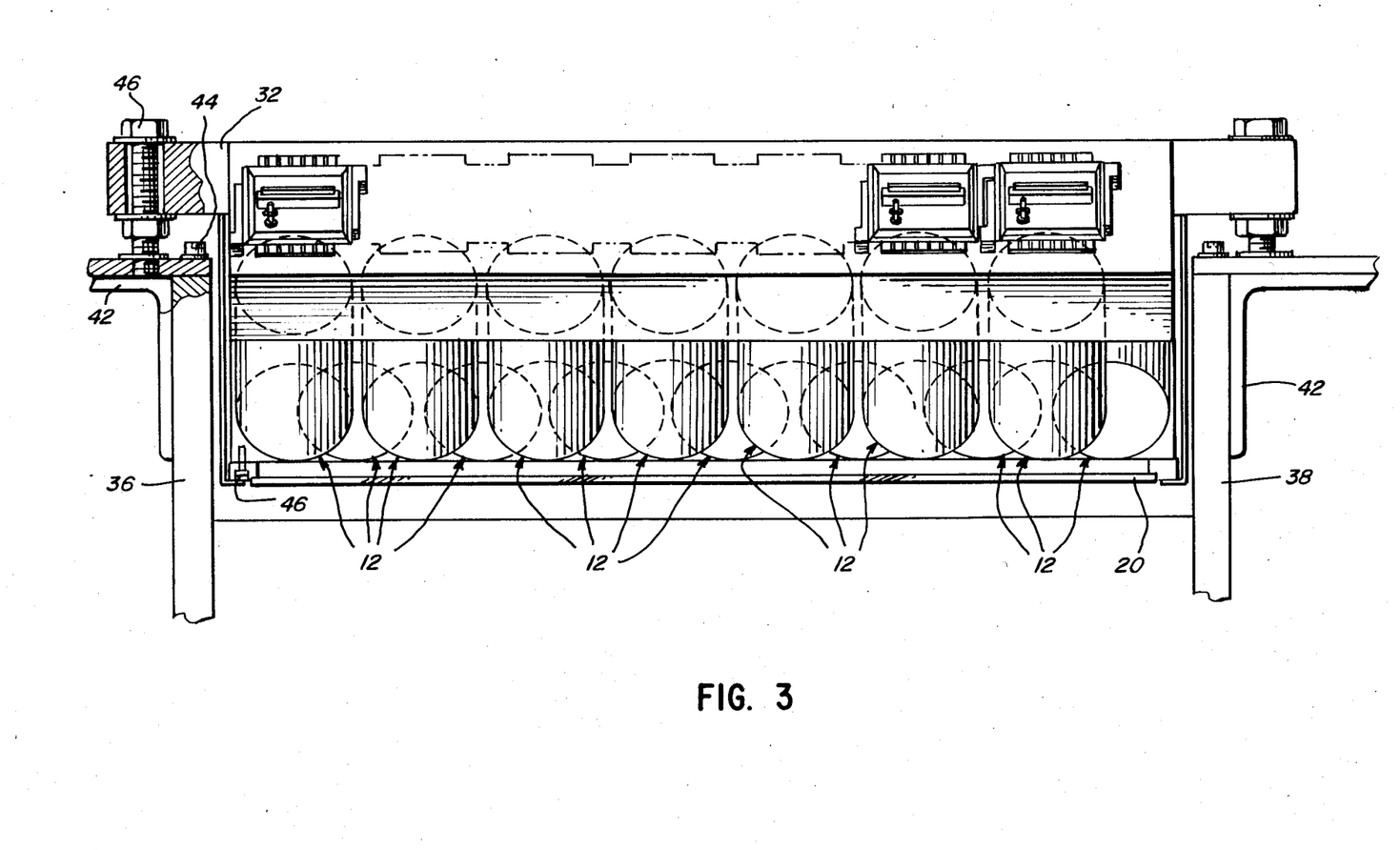
FIG. 3 is a side elevational view, on an enlarged scale, of the optical imaging head of FIG. 1, best illustrating the staggered configuration of the imaging devices.

As can be seen in FIGS. 1 and 3, fingers 26 of one interlaced reflector 24A, reflecting the image segments produced by imaging devices 12 of row 18A, are positioned between cut out portions 30 of the second interlaced reflector 24B. Alternately, fingers 26 of the second interlaced reflector 24B, reflecting the reproduced images of row 18B, are positioned between cut out portions 30 of the first interlaced reflector 24A. Reflectors 24A and 24B may include, but are not limited to, a pair of interlaced notched mirrors and the like.

Accordingly, an interlaced reflecting structure is provided having alternate fingers 26 angled with respect to one another. This interlaced configuration allows the image segments reproduced by each row of imaging devices 18A and 18B to be directed along a portion of a plane perpendicular to focal plane 20 and positioned end-to-end, in line, on the focal plane. The first image segment from the first imaging device of row 18A appears in the first position, while the image segment from the first imaging device of row 18B appears directly next to, and in line with, the first image segment of row 18A. This configuration provides a complete coherent, contiguous line of image segments directed onto focal plane 20 in a staggered configuration. As illustrated, the image line which is reproduced onto focal plane 20 comprises 14 image segments reproduced by 14 imaging devices 12.

Figure 4:
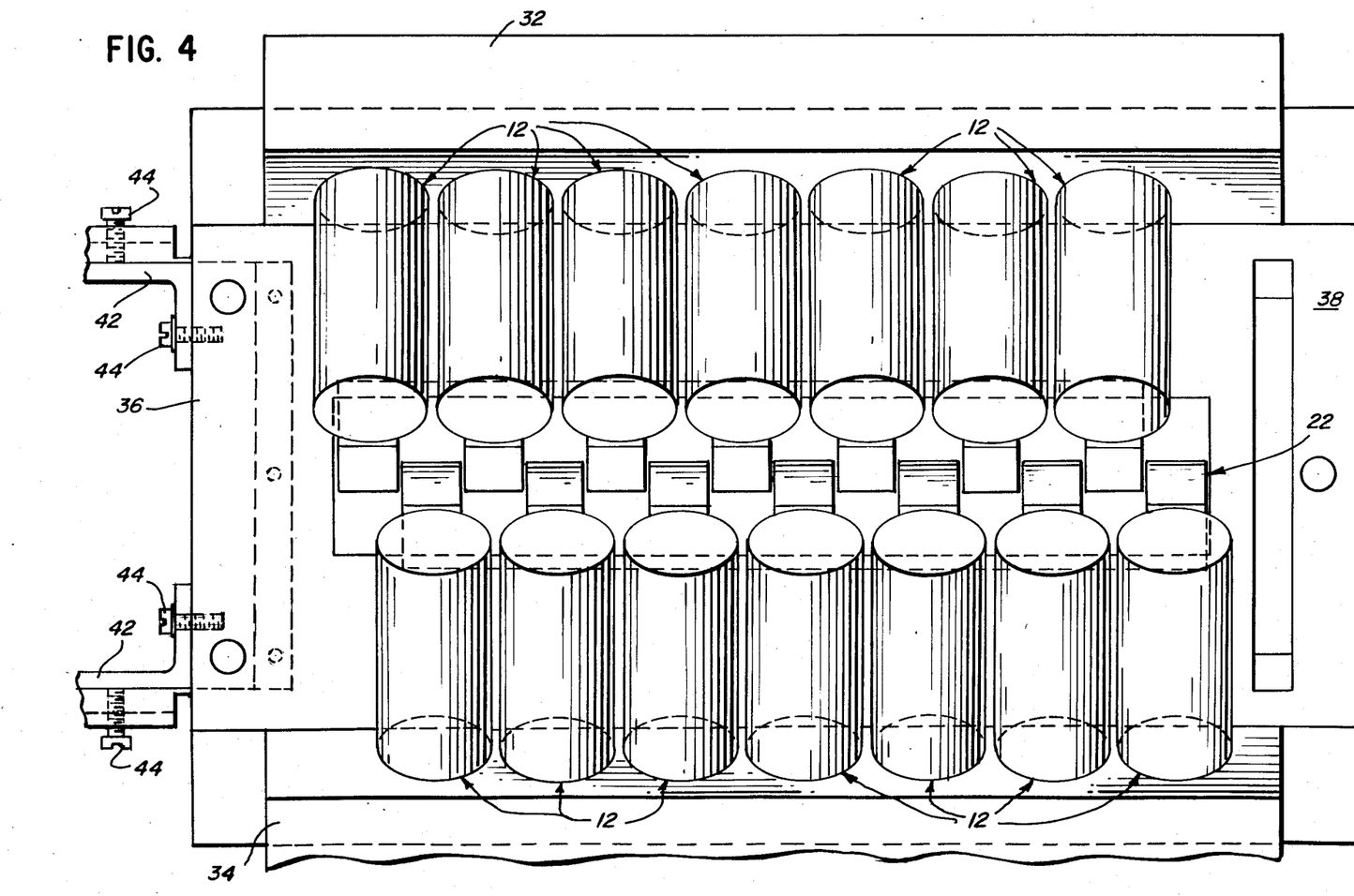
FIG. 4 is a top plan view, on an enlarged scale, best illustrating the in line configuration of the image segments and the mounting of the optical imaging head of FIG. 1.

In use, the optical imaging head is mounted to a frame, such as a rigid frame illustrated in FIGS. 2, 3, and 4. The frame includes main members 32 and 34 which span the length of the two row configuration (18A and 18B) of imaging devices 12. The frame also includes side members 36 and 38 which are connected to main members 32 and 34 through fasteners, such as bolts 40. A plurality of brackets 42 and associated fasteners 44 are included to provide selectively adjustable mounting of the optical imaging head 10 to the frame of the optical imaging device with which the optical imaging head is associated. In addition, focal plane 20 is mounted to the frame of the optical imaging head through fasteners 46 at either end thereof.

FIGS. 5 through 8 illustrate a second exemplary embodiment of the opitcal imaging head 10' of this invention. The optical imaging head of this embodiment includes a plurality of imaging devices 12' each having an associated light switched array 13' positioned behind a lens system 14' and surrounded by a housing 16' as described hereinabove with respect to the first exemplary embodiment of FIGS. 1 through 4. As described above, each light switched array 13' receives a representation of a reproduced image in the form of an electronic signal at connections 17A' and 17B'. Each light switched aray 13' includes a plurality of shutters illuminated by a light source for reproduction of the reproduced image which is focused by transmission through lens system 14'.

As with the first embodiment described above, imaging devices 12' are configured such that they form two rows 18A' and 18B'. The second embodiment differs from the first embodiment in that one row 18A' of imaging devices 12' is focused directly onto the focal plane, while the imaging devices 12' of row 18B' are off axis at an acute angle with respect to a plane perpendicular to focal plane 20'. Accordingly, a reflecting structure 22' is included to allow direct focusing of a portion of the reproduced image segments onto the focal plane 20', while reflecting at least one of the image segments generally perpendicularly onto focal plan 20'. This type of selective reflection of image segments provides a substantially undistorted, coherent, contiguous line of image segments.

Figure 5:
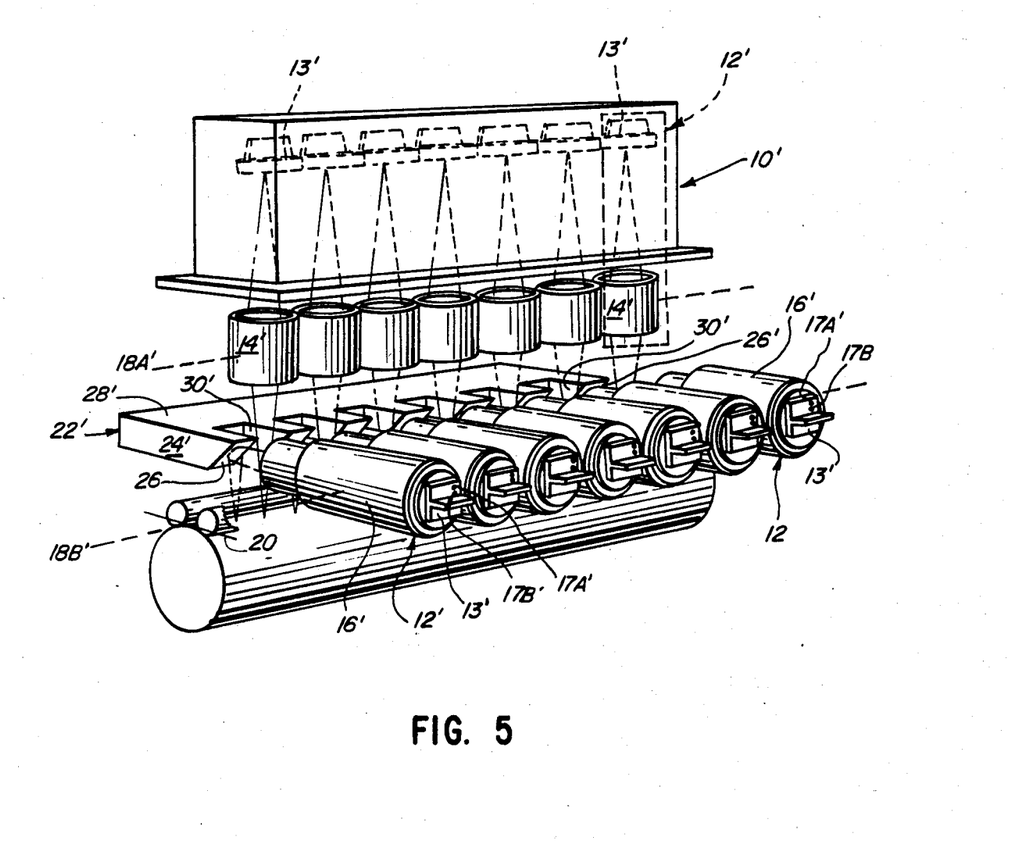
FIG. 5 is a perspective view of a second embodiment of an optical imaging head of this invention.
Figure 6:
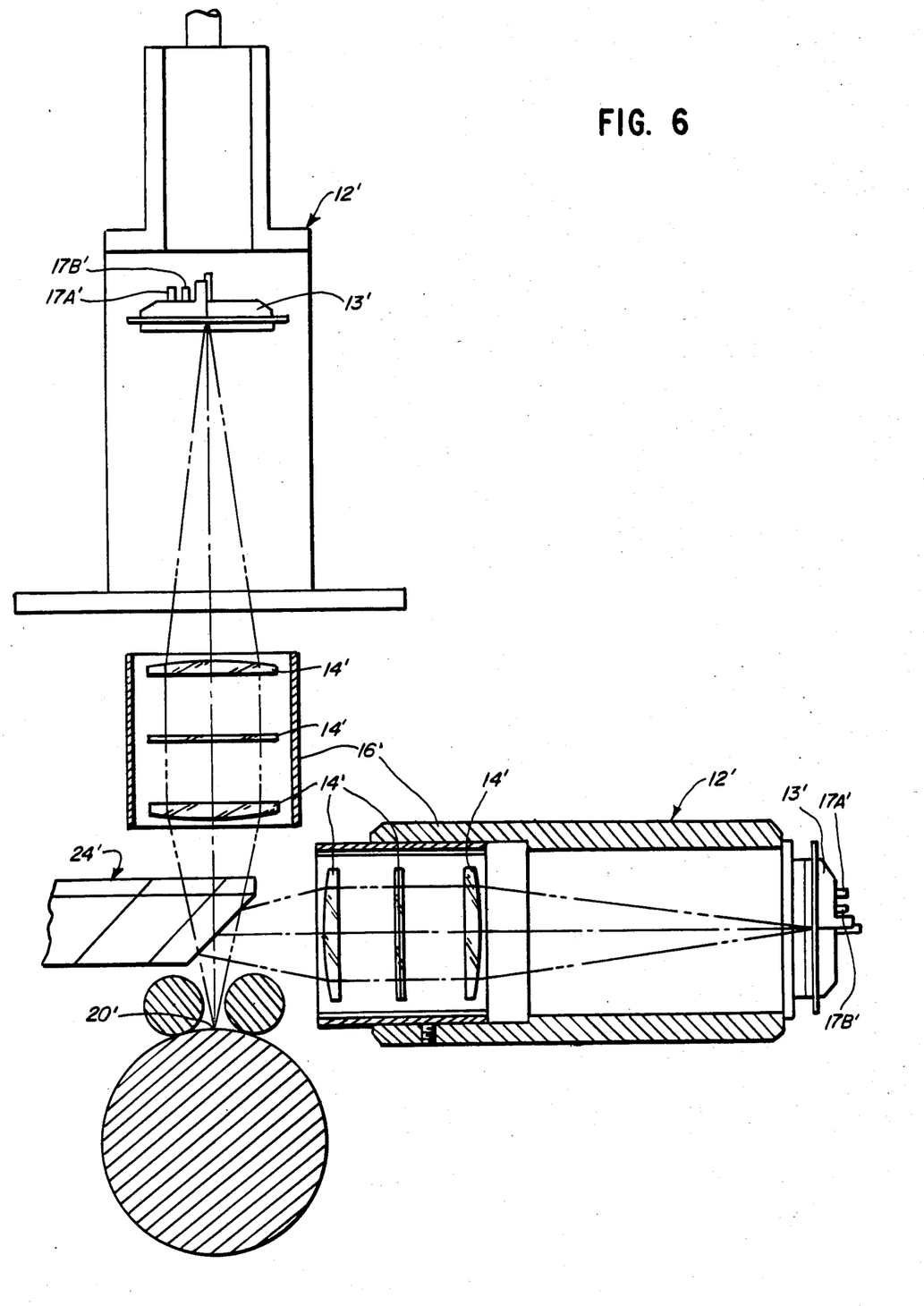
FIG. 6 is a front elevational view, on an enlarged scale, of the optical imaging head of FIG. 5.
Figure 7:
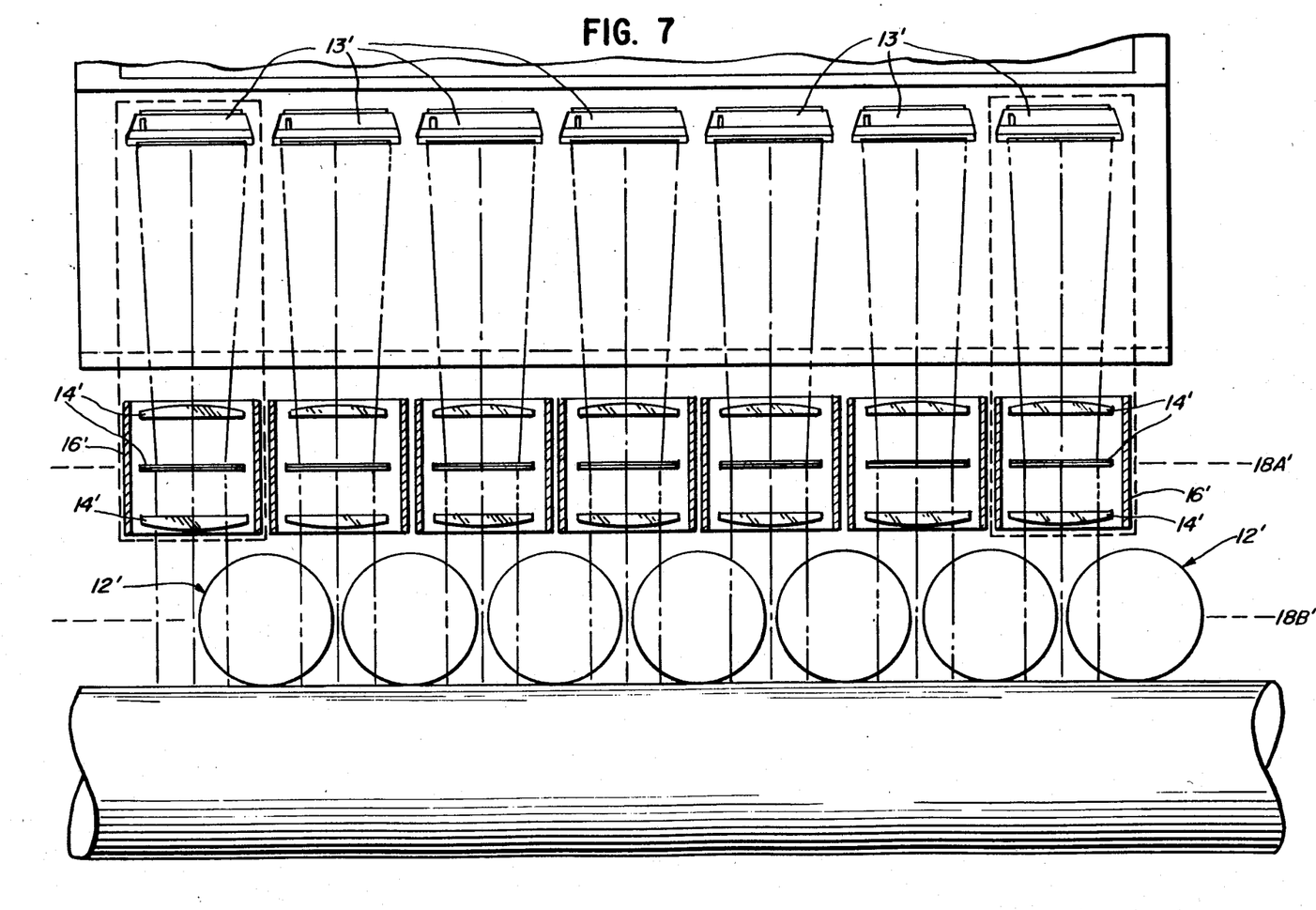
FIG. 7 is a side elevational view, on an enlarged scale, of the optical imaging head of FIG. 5, best illustrating direct imaging of one row of imaging devices and reflective imaging of a second row of imaging devices.
Figure 8:
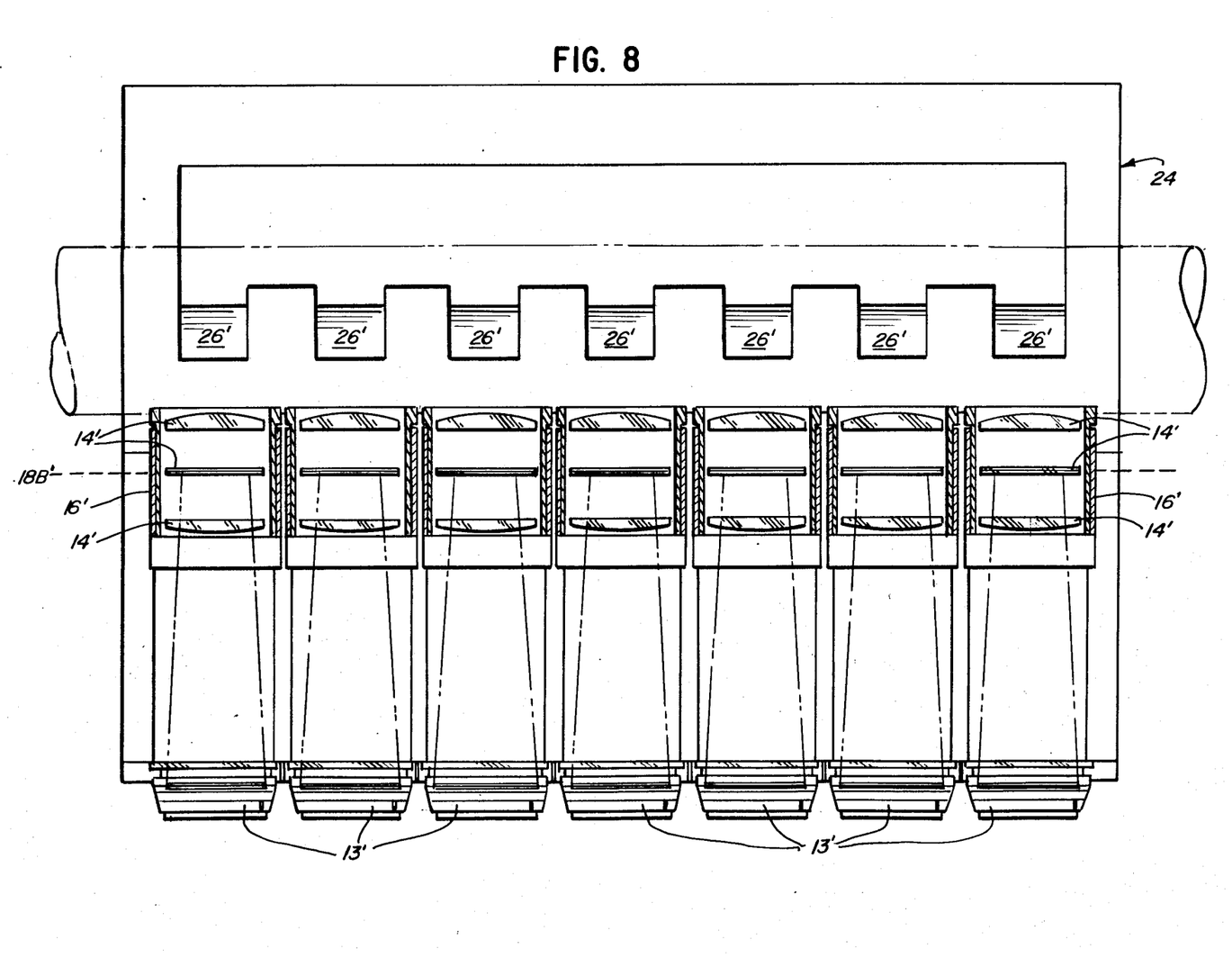
FIG. 8 is a top plan view, on an enlarged scale, of the optical imaging head of FIG. 5, best illustrating the notched configuration of the reflecting structure.

As shown in FIGS. 5, 6 and 7, a single reflector 24' includes a plurality of surfaces, illustrated as fingers 26'. Fingers 26' eminate from from an integral base portion 28' of reflector 24' providing a rigid structure which may be positioned to properly reflect a respective image segment produced by imaging devices 12' of row 18A'. Reflector 24' is constructed such that a non-reflective or transparent cut out section 30' separates each finger 26', generally configuring the reflector 24' as a notched mirror.

In operation, imaging device 12' of row 18A' are focused directly onto focal plane 20', passing through cut out sections 30' of reflector 24'. Row 18B' of imaging device 12' are positioned such that they are at an angle with respect to a plane perpendicular to focal plane 20', and the image segments are reflected by fingers 26' of reflecting structure 24', perpendicularly impinging upon focal plane 20'. This configuration allows the image segments reproduced by row 18A' to be focused along a plane perpendicular to focal plane 20' and focused directly thereon, and the image segments reproduced by row 18B' to be reflected onto focal plane 20' and directed along a portion of the plane perpendicular to focal plane 20'. This configuration also allows end-to-end in line positioning of the image segments of rows 18A' and 18B' to appear in a complete coherent and contiguous line at focal plane 20'. Further, this configuration allows alternate image segments from rows 18A' and 18B' to be staggered, while maintaining the in line, contiguous configuration and allowing line-by-line reproduction of the original image on focal plane 20' as previously described with respect to the first embodiment of FIGS. 1 through 4.

It should be understood that alternate configurations of imaging devices 12 and 12', light switched arrays 13 and 13', lens systems 14 and 14', and reflecting structures 24A, 24B, and 24' are contemplated by this invention. One such configuration includes, but is not limited to, a single lens system and a multielement reflecting structure, similar to that of FIG. 1, disposed directly above the focal plane which reflects the light rays from two rows of staggered imaging devices disposed on either side of the lens system and reflecting structure. It should also be understood that the reflecting structure in such a configuration would be a 14 element reflector having adjustable individual elements for reflecting each of the light rays such that they perpendicularly impinge upon the focal plane.

While the reflectors illustrated herein are mult-element, adjustable mirrors or notches mirrors, it can be appreciated by those skilled in the art that a variety of constructions may be utilized. Such constructions may include, but are not limited to, an integral glass or plastic plate with segmented illuminized sections; a metallic integral structure; mounted, individually adjustable glass or plastic mirrored segments or the like.

While the configuration of the light switched arrays, lenses and reflectors can take on a variety of configurations, it should be noted that the path of the light rays of any two staggered reproduced image segments are configured generally in the shape of a "Y". In the configurations contemplated herein, this "Y" configuration may be considered an inverted "Y" configuration or a "T" configuration wherein the arms of the "Y" are perpendicular to the body. This type of configuration should be contracted with the "V" configuration wherein the light rays impinge the focal plane angularly rather than perpendicularly.

Thus, it can be seen that a new and improved optical imaging head is disclosed which provides perpendicular direction and reflection of reproduced image segments onto a focal plane. The optical imaging head reduces the deformation and/or distortion of the reproduced image segments while reducing separation of alternate reproduced image segments, thereby producing an improved reproduced image having superior resolution and coherency. Further, the optical imaging head of this invention prevents increased degradation of the reproduced image segments as the distance between the imaging devices and the focal plane is varied.

From the foregoing, it will be appreciated that numerous variations and modifications may be effected without departing from the spirit and scope of the novel concept of the subject invention. It is to be understood that no limitation with respect to the specific apparatus illustrated herein is intended or should be inferred.

What is claimed is:

1. An optical imaging head for directing an image onto a focal plane, comprising:
   a plurality of first imaging devices for forming a plurality of first, spaced reproduced image segments of an original image onto the focal plane in a linear array;

a plurality of second imaging devices for forming a plurality of second, spaced reproduced image segments of the original image onto the focal plane in a linear array between the spaced reproduced image segments formed by the first imaging devices; and reflecting means for reflecting the spaced reproduced image segments from at least one of the first and second plurality of imaging devices onto the focal plane simultaneously along the same line location on the focal plane as the other of the first and second plurality of imaging devices such that the first and second spaced reproduced image segments combine in an alternating array to simultaneously emulate a complete line of the original image.

2. The optical imaging head of claim 1 wherein said plurality of first imaging devices are positioned to one side of an axis perpendicularly intersecting said focal plane, said plurality of second imaging devices are positioned to another side of said axis, and said reflecting means reflecting the first and second reproduced image segments onto the focal plane.

3. The optical imaging head of claim 2 wherein said reflecting means include a plurality of spaced reflective surfaces for reflecting said reproduced image segments onto said focal plane.

4. The optical imaging head of claim 3 wherein said reflective surfaces are selectively adjustable for reflecting said image segments onto said focal plane.

5. The optical imaging head of claim 1 wherein said plurality of first imaging devices are positioned such that the image segments reproduced thereby are directed generally perpendicularly onto said focal plane and said plurality of second imaging devices are positioned to one side of an axis perpendicularly intersecting said focal plane such that the image segments reproduced thereby are reflected by said reflecting means generally perpendicularly onto said focal plane.

6. The optical imaging head of claim 5 wherein said reflecting means include a plurality of spaced reflective surfaces for reflecting said reproduced image segments onto said focal plane.

7. An optical imaging head for directing an image onto the focal plane, comprising:

a plurality of first imaging devices for forming a plurality of first, spaced reproduced image segments of an original image, said plurality of first imaging devices being positioned such that the image segments reproduced thereby are directed generally perpendicularly onto said focal plane;

a plurality of second imaging devices for forming a plurality of second, spaced reproduced image segments of the original image, said plurality of second imaging devices being positioned to one side of an axis perpendicularly intersecting said focal plane; and reflecting means including a plurality of selectively adjustable, spaced reflective surfaces for reflecting the image segments from said second plurality of imaging devices generally perpendicularly onto said focal plane such that the first and second reproduced image segments combine in an alternating array to emulate the complete original image.

8. An optical imaging head for directing an image onto a focal plane, comprising:

a plurality of first imaging devides for forming a plurality of first, spaced reproduced image segments of an original image, said plurality of first imaging devices being positioned such that the image segments reproduced thereby are directed generally perpendicularly onto said focal plane;

a plurality of second imaging devices for forming a plurality of second, spaced reproduced image segments of the original image, said plurality of second imaging devices being positioned to one side of an axis perpendicularly intersecting said focal plane; and reflecting means in the form of an integral reflective surface having a plurality of reflecting portions for reflecting the image segments from said second plurality of imaging devices generally perpendicularly onto said focal plane such that the first and second reproduced image segments combine in an alternating array to emulate the complete original image.

9. The optical imaging head of claim 8 wherein said integral reflective surface comprises a notched mirror having alternate reflecting portions and non-reflecting cut-out portions.

10. An optical imaging head for directing an image onto a focal plane, comprising:

a plurality of first imaging devices for forming a plurality of first, spaced reproduced image segments of an original image;

a plurality of second imaging devices for forming a plurality of second, spaced reproduced image segments of the original image; and reflecting means for reflecting the image segments from at least one of the first and second plurality of imaging devices onto the focal plane in a manner such that the first and second reproduced image segments combine in an alternating array to emulate the complete original image, said reflecting means comprising a pair of notched mirrors configured such that the reflective portions of one notched mirror project through non-reflecting cut-out portions of the second notched mirror thereby forming an interlaced notched mirror configuration.

11. An optical imaging head for directing an image onto a focal plane, comprising:

a plurality of first imaging devices for forming a plurality of first, spaced reproduced image segments of an original image;

a plurality of second imaging devices for forming a plurality of second, spaced reproduced image segments of the original image; and reflecting means for reflecting the image segments from at least one of the first and second plurality of imaging devices onto the focal plane in a manner such that the first and second reproduced image segments combine in an alternatng array to emulate the complete original image, said reflecting means including a pair of reflector elements each having a plurality of reflective surfaces defining transparent cut-out portions therebetween, said pair of reflectors being interlaced such that the reflective surfaces of one reflector are positioned between the transparent cut-out portions of the second reflector and the reflective surfaces of the second reflector are positioned between the transparent cut-out portions of the first reflector, each of said reflective surfaces reflecting a predetermined image segment.

12. An optical imaging head for directing an image onto a focal plane, comprising:
- a plurality of first imaging devices positioned to one side of an axis perpendicularly intersecting said focal plane for forming a plurality of first, spaced reproduced image segments of an original image;
- a plurality of second imaging devices positioned to another side of said axis for forming a plurality of second, spaced reproduced image segments of the original image; and
- reflecting means for reflecting the image segments from at least one of the first and second plurality of imaging devices onto the focal plane in a manner such that the first and second reproduced image segments combine in an alternating array to emulate the complete original image, said reflecting means including a pair of reflector elements each having a plurality of reflective surfaces defining transparent cut-out portions therebetween, said pair of reflectors being interlaced such that the reflective surfaces of one reflector are positioned between the transparent cut-out portions of the second reflector and the reflective surfaces of the second reflector are positioned between the transparent cut-out portions of the first reflector, each of said reflective surfaces reflecting a predetermined image segment.

* * * * *